United States Patent [19]
Yamashita et al.

[11] Patent Number: 6,140,418
[45] Date of Patent: Oct. 31, 2000

[54] THERMOPLASTIC POLYMER COMPOSITION

[75] Inventors: Takashi Yamashita; Toru Kuki; Kenji Shachi, all of Tsukuba, Japan

[73] Assignee: Kuraray Co., Ltd., Kurashiki, Japan

[21] Appl. No.: 09/068,568

[22] PCT Filed: Oct. 2, 1997

[86] PCT No.: PCT/JP97/03523

§ 371 Date: May 21, 1998

§ 102(e) Date: May 21, 1998

[87] PCT Pub. No.: WO98/14518

PCT Pub. Date: Apr. 9, 1998

[30] Foreign Application Priority Data

Oct. 4, 1996 [JP] Japan .................................. 8-281614

[51] Int. Cl.⁷ .................................................. C08L 52/02
[52] U.S. Cl. ............................ 525/88; 525/91; 525/191; 525/232
[58] Field of Search .............................. 525/88, 99, 191, 525/232

[56] References Cited

U.S. PATENT DOCUMENTS 5,276,094  1/1994  Kaszas et al. ............................ 525/88
5,721,331  2/1998  Shachi et al. ........................... 526/347

FOREIGN PATENT DOCUMENTS

| 0 529 957 | 3/1993 | European Pat. Off. . |
| 0 572 667 | 12/1993 | European Pat. Off. . |
| 0 597 362 | 5/1994 | European Pat. Off. . |
| 58-206644 | 12/1983 | Japan . |
| 59-131613 | 7/1984 | Japan . |
| 63-112649 | 5/1988 | Japan . |
| 5-310868 | 11/1993 | Japan . |
| 6-200098 | 7/1994 | Japan . |
| WO 91/09083 | 6/1991 | WIPO . |

OTHER PUBLICATIONS

Patents Abstracts of Japan, vol. 008, No. 251 (C–252), Nov. 16, 1984, JP 59 131613, Jul. 28, 1984.
Patents Abstracts of Japan, vol. 017, No. 655 (C–1136), Dec. 6, 1993, JP 05 212104, Aug. 24, 1993.

Primary Examiner—James J. Seidleck
Assistant Examiner—Olga Asinovsky
Attorney, Agent, or Firm—Oblon, Spivak, McClelland, Maier & Neustadt, P.C.

[57] ABSTRACT

Described are a thermoplastic polymer composition comprising (A) a block copolymer formed of a polymer block composed mainly of an aromatic vinyl compound and another polymer block composed mainly of isobutylene; and (B) a crosslinked rubber of at least one rubber selected from natural rubber, diene polymer rubber, olefin polymer rubber, acrylic rubber and fluorine rubber at a weight ratio of 90:10 to 10:90; and molded or formed products and hermetically sealing materials produced using the composition. The above thermoplastic polymer composition is excellent in moldability or formability, gas barrier properties, compression set resistance, hermetically sealing properties, sealing properties, flexibility, mechanical properties, oil resistance, safety, hygienic properties and the like. By melt molding or forming of the composition under heat, general-purpose molded or formed products, hermetically sealing materials such as sealant, packing material or gasket, particularly, stopper or gasket for syringe for the medical use can be produced smoothly.

11 Claims, 1 Drawing Sheet

THERMOPLASTIC POLYMER COMPOSITION

TECHNICAL FIELD

The present invention relates to a thermoplastic polymer composition comprising a block copolymer formed of an aromatic vinyl compound polymer block and an isobutylene polymer block, and a crosslinked rubber at a predetermined ratio; and molded or formed products, hermetically sealing materials and gaskets for syringe produced from the above thermoplastic polymer composition. The thermoplastic polymer composition according to the present invention can be used effectively for various applications such as hermetically sealing materials such as sealant, gasket and packing material and other molded or formed products, making use of its excellent properties such as formability or moldability, mechanical properties, flexibility, elastic recovery, gas barrier properties, hermetically sealing properties, safety and hygienic properties.

BACKGROUND ART

As a high molecular material having elasticity, generally employed are those obtained by mixing a natural rubber or a synthetic rubber such as diene polymer rubber or olefin polymer rubber (ex. ethylene-propylene-diene copolymer rubber) with a crosslinking agent, reinforcing agent, processing assistant and/or the like and crosslinking the resulting mixture under high temperature and high pressure conditions.

The above-described conventionally-used natural rubber or synthetic rubber however requires steps for crosslinking and molding or forming over a long period of time under high temperature and high pressure conditions so that it is poor in handling properties and productivity. In view of such drawbacks of the natural or synthetic rubber, various thermoplastic elastomers, similar to ordinarily used thermoplastic resins, from which a molded or formed product can be prepared easily by making use of the general-purpose melt molding or forming technique such as hot pressing, injection molding or extrusion have been developed recently.

As the prior art relating to a thermoplastic elastomer or its composition, known are:

(1) an elastomeric composition (Japanese Patent Application Laid-Open No. SHO 58-206644) which is obtained by mixing, with a view toward improving flexibility, thermal deformation resistance and mechanical strength, a block copolymer formed of an aromatic vinyl compound polymer block and a hydrogenated conjugated diene polymer block with a softener for a non-aromatic rubber and a propylene 1-olefin copolymer and optionally an inorganic filler;

(2) an elastomeric composition (Japanese Patent Application Laid-Open No. SHO 59-131613) which is obtained by mixing, with a view toward improving flexibility, resistance to high-temperature compression set, mechanical strength, oil resistance and moldability or formability, a block copolymer formed of an aromatic vinyl compound polymer block and a hydrogenated conjugated diene polymer block with a softener for a non-aromatic rubber and a peroxide decomposition type olefin resin and optionally an inorganic filler; and (3) a hydrogenated block copolymer composition (Japanese Patent Application Laid-Open No. SHO 63-112649), which is obtained by mixing, with a view toward improving flexibility, high-temperature compression set resistance, high-temperature creep properties, mechanical strength, moldability or formability, oil resistance and anti-stickiness, a block copolymer formed of an aromatic vinyl compound polymer block and a hydrogenated conjugated diene polymer block with a softener for a non-aromatic rubber, a polyolefin resin, an olefin copolymer rubber and a reaction type alkylphenol/formaldehyde resin and then, subjecting the resulting mixture to dynamic vulcanization.

The above-described conventional elastomeric compositions (1) to (3) are recognized to have improved moldability or formability, oil resistance and compression set resistance to some extent, but do not have sufficient gas barrier properties, sealing properties and viscosity of the material itself. When these conventional elastomeric compositions are used for hermetically sealing materials such as packing material, sealant, gasket or stopper, they cannot be used effectively as hermetically sealing materials because of liquid leakage from the sealing stopper, liquid leakage after needle insertion and separation of broken pieces from the material by needle insertion.

In addition, a composition for medical material which is composed mainly of an isobutylene-polymer-block-containing block copolymer is known (Japanese Patent Application Laid-Open No. HEI 5-310868). Although the composition has a low adsorption amount level of a drug ingredient, it cannot be used effectively as a hermetically sealing material because of low compression set resistance and poor elastic recovery.

Among rubbers, a butyl rubber is known to have excellent gas barrier properties (Japanese Patent Application Laid-Open No. HEI 6-200098). When a mixture of a butyl rubber which serves as a main component with a block copolymer formed of an aromatic vinyl compound polymer block and an isobutylene polymer block is formed into a sheet, followed by curing under heat, the resulting product is a thermosetting type and has therefore insufficient moldability or formability. It is therefore difficult to obtain a polymer composition excellent in both moldability or formability and gas barrier properties.

Under such circumstances, there has been a demand for an elastomeric composition which has excellent flexibility, small high-temperature compression set, excellent elastic recovery, excellent properties such as mechanical properties, oil resistance and moldability or formability and besides, excellent gas barrier properties and excellent hermetically sealing properties; and can be used effectively as hermetically sealing materials. Materials which can satisfy such requirements are however not available at present.

An object of the present invention is therefore to provide a thermoplastic elastomeric polymer composition which has excellent moldability or formability and gas barrier properties, small compression set, excellent elastic recovery, good hermetically sealing properties and sealing properties and excellent flexibility, mechanical properties, oil resistance, safety and hygienic properties; and can be formed easily, similar to the ordinarily-employed thermoplastic polymer, by the general-purpose hot melt forming or molding method such as extrusion, injection molding or press molding.

Another object of the present invention is to provide hermetically sealing materials such as sealant, packing material and gasket and other molded or formed products by using the above-described thermoplastic polymer composition having excellent properties. In particular, a further object of the present invention is to provide hermetically sealing materials for a gasket for syringe or other medical tools and hermetically sealing materials used in the food-related field.

DISCLOSURE OF INVENTION

With a view to attaining the above objects, the present inventors have carried out an extensive investigation. As a result, it has been found that a polymer composition available by using a block copolymer formed of an aromatic vinyl compound polymer block and an isobutylene polymer block, instead of a hydrogenated block copolymer formed of an aromatic vinyl compound polymer block and a conjugated diene polymer as used in the above-described conventional elastomeric polymer compositions (1) to (3), and mixing said block copolymer with a certain crosslinked rubber at a predetermined ratio can be subjected to hot melt forming or molding or hot processing similar to the general thermoplastic resin and therefore has excellent formability or moldability; and that the thermoplastic polymer composition so obtained is also excellent in flexibility, mechanical properties and oil resistance, and moreover is excellent in gas barrier properties, excellent in hermetically sealing properties and sealing properties due to a small compression set and furthermore, is excellent in safety and hygienic properties.

It has also been found by the present inventors that when hermetically sealing materials such as sealant, packing material or gasket are produced using the above thermoplastic polymer composition, they have excellent hermetically sealing properties, sealing properties and safety without liquid leakage and elution to a liquid; and the hermetically sealing materials so produced can therefore be used effectively for the various medical tools or in the food-related fields, leading to the completion of the present invention.

In the present invention, there is thus provided a thermoplastic polymer composition comprising (A) a block copolymer formed of a polymer block composed mainly of an aromatic vinyl compound and another polymer block composed mainly of isobutylene; and (B) a crosslinked product of at least one rubber selected from natural rubber, diene polymer rubber, olefin polymer rubber, acrylic rubber and fluorine rubber at a weight ratio of 90:10 to 10:90.

In the present invention, there are also provided molded or formed products and hermetically sealing materials each composed of the above-described thermoplastic polymer composition.

BEST MODE FOR CARRYING OUT THE INVENTION

Figure 1:
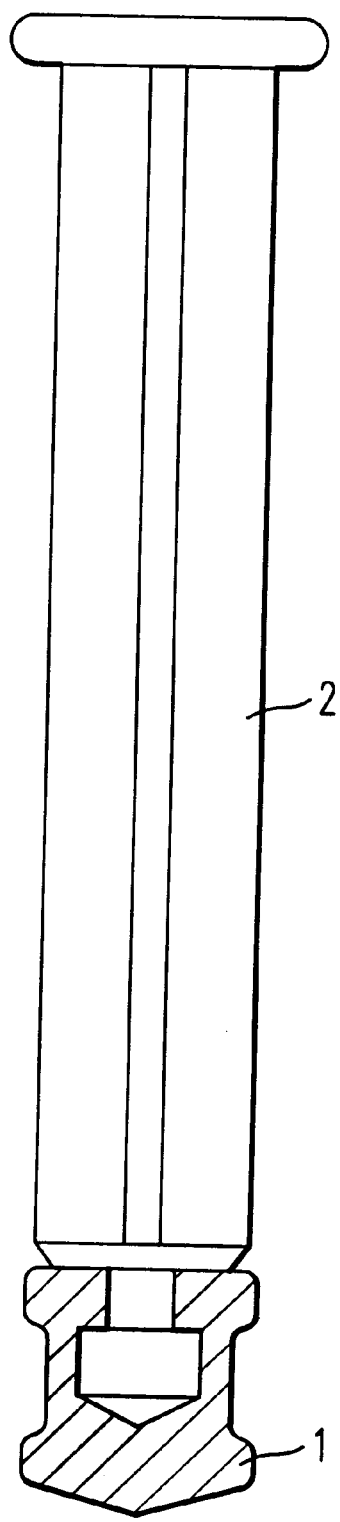
FIG. 1 illustrates the shapes of a gasket used for the evaluation of the performance of the gasket for syringe in Examples of the present invention, and an operation rod which has fixed the gasket.

The present invention will next be described more specifically.

The block copolymer (A) used in the thermoplastic polymer composition of the present invention is a block copolymer formed of a polymer block [which will hereinafter be called "aromatic vinyl compound polymer block (a)] composed mainly of an aromatic vinyl compound and a polymer block [which will hereinafter be called "isobutylene polymer block (b)] composed mainly of isobutylene.

The aromatic vinyl compound polymer block (a) is formed mainly of the structural units of an aromatic vinyl compound and it sometimes contain the structural units of another copolymerizable monomer in a small amount.

Examples of the aromatic vinyl compound constituting the aromatic vinyl compound polymer block (a) include aromatic vinyl compounds such as styrene, α-styrene, β-styrene, p-methylstyrene, t-butylstyrene, 2,4,6-trimethylstyrene, monofluorostyrene, difluorostyrene, monochlorostyrene, dichlorostyrene, methoxystyrene, indene and acetonaphthylene. The aromatic vinyl compound polymer block (a) may contain the structural units composed of only one or two or more of the above-exemplified aromatic vinyl compounds. Among them, the aromatic vinyl compound polymer block (a) is preferred to be formed mainly of the structural units composed of styrene.

When the aromatic vinyl compound polymer block (a) contains the structural units composed of an aromatic vinyl compound and also the structural units composed of another copolymerizable monomer, it is preferred that the ratio of the structural units composed of said another copolymerizable monomer is 30 wt. % or lower based on the weight of the aromatic vinyl compound polymer block (a), with 10 wt. % or lower being more preferred. Examples of said another copolymerizable monomer include cationic polymerizable monomers such as 1-butene, pentene, hexene, butadiene, isoprene and methylvinyl ether.

The isobutylene polymer block (b) in the block copolymer (A) is formed mainly of the structural units composed of isobutylene and it is, in some cases, a polymer block containing the structural units composed of another copolymerizable monomer in a small amount.

When the isobutylene polymer block (a) contains the structural units composed of isobutylene and also the structural units composed of another copolymerizable monomer, it is preferred that the ratio of the structural units composed of said another copolymerizable monomer is 30 wt. % or lower based on the weight of the isobutylene polymer block (b), with 10 wt. % or lower being more preferred. Examples of said another copolymerizable monomer include cationic polymerizable monomers such as 1-butene, pentene, hexene, butadiene, isoprene and methylvinyl ether.

In the block copolymer (A), the weight ratio of [the structural units composed of an aromatic vinyl compound] to [the structural units composed of isobutylene] falls within a range of 5:95 to 80:20, with a weight ratio ranging from 10:90 to 70:30 being more preferred from the viewpoints of gas barrier properties and mechanical properties of the polymer composition.

No particular limitation is imposed on the binding form of the aromatic vinyl compound polymer block (a) and isobutylene polymer block (b) in the block copolymer (A) insofar as the aromatic vinyl compound polymer block (a) and isobutylene polymer (b) are bound in the form of a block. Examples include a block copolymer represented by the following formulas (I) to (III):

a-b (I)

a-(b-a)*m* (II)

b-(a-b)*n* (III)

wherein a represents an aromatic vinyl compound polymer block (a), b represents an isobutylene polymer block (b) and m and n each independently represents an integer of 1 or greater (for example, 1 to 5).

Among them, a block copolymer (A) represented by the above formula (II) wherein m stands for 1, that is, a triblock copolymer having a block structure formed of an aromatic vinyl compound polymer block (a), an isobutylene polymer block (b) and an aromatic vinyl compound polymer block (a) are preferred in the present invention, from the viewpoints of handling ease, mechanical properties and availability.

In addition, the block copolymer (A) is preferred to be formed of an aromatic vinyl compound polymer block (a) having a number-average molecular weight of from 2500 to 50000 and an isobutylene polymer block (b) having a number-average molecular weight of from 10000 to 100000 and in addition, to have a number-average molecular weight of 15000 to 150000 as a whole.

The block copolymer (A) may sometimes contain, in the middle and/or at the terminal of the molecular chain, a functional group, for example, a halogen atom such as chlorine or bromine, a carboxy group, a hydroxy group, an acid anhydride group or an epoxy group.

No particular limitation is imposed on the preparation process or obtaining method of the block copolymer (A). Any one of the above-described block copolymers containing an aromatic vinyl compound polymer block (a) and an isobutylene polymer block (b) can be used. The block copolymer (A) may be prepared for the polymer composition of the present invention, or the commercially available block copolymer (A) may be used as is. It is also possible to obtain the block copolymer (A) by another method.

No particular limitation is imposed on the preparation process, but the block copolymer (A) can be prepared by the conventionally known process. For example, it can be prepared by carrying out step-wise polymerization of a monomer composed mainly of an aromatic vinyl compound and a monomer composed mainly of isobutylene in a free order in the presence of an initiator system formed of a Lewis acid and an organic compound which forms a cationic polymerization active species with the Lewis acid and optionally in the co-existence of an additive such as pyridine derivative or amide in an inactive solvent such as hexane or methylene chloride, thereby forming each polymer block one after another.

Examples of the above Lewis acid include titanium tetrachloride, boron trichloride, aluminum chloride and tin tetrachloride. Examples of the organic compound which forms a cationic polymerization active species include organic compound having a functional group such as alkoxy group, acyloxy group or halogen atom. Specific examples include bis(2-methoxy-2-propyl)benzene, bis(2-acetoxy-2-propyl)benzene and bis(2-chloro-2-propyl)benzene. Examples of the amide include dimethylacetamide and dimethylformamide.

Described specifically, a triblock copolymer having, for example, a block structure of an aromatic vinyl compound polymer block (a), an isobutylene polymer block (b) and an aromatic vinyl compound polymer block (a) can be prepared by using an organic compound having one functional group and a Lewis acid, each as exemplified above, as an initiator system, adding a monomer composed mainly of an aromatic vinyl compound to a polymerization system to effect polymerization, after substantial completion of the polymerization, adding a monomer composed mainly of isobutylene to the polymerization system to effect polymerization and then, after substantial completion of the latter polymerization, adding a monomer composed mainly of an aromatic vinyl compound to the polymerization system to effect polymerization.

Alternatively, the triblock copolymer having a block structure of an aromatic vinyl compound polymer block (a), an isobutylene polymer block (b) and an aromatic vinyl compound polymer block (a) can also be prepared by polymerizing a monomer composed mainly of isobutylene by using two functional compounds; and after the substantial completion of the polymerization, supplying a monomer composed mainly of an aromatic vinyl compound, thereby binding the aromatic vinyl compounds with both terminals of the preliminarily prepared isobutylene polymer to effect polymerization.

In the thermoplastic polymer composition of the present invention, a crosslinked product of at least one rubber selected from natural rubber, diene polymer rubber, olefin polymer rubber, acrylic rubber and fluorine rubber is used as the crosslinked rubber (B).

Examples of the diene polymer rubber described above include isoprene polymer rubber (IR), styrene.butadiene copolymer rubber (SBR), butadiene polymer rubber (BR), acrylonitrile.butadiene copolymer rubber (NBR) and chloroprene polymer rubber (CR).

Examples of the olefin polymer rubber include ethylene.propylene.diene copolymer rubber (EPDM), isobutylene.isoprene copolymer rubber (IIR), halogenated isobutylene.isoprene copolymer rubber (CIIR, BIIR), isobutylene.halogenated p-methyl styrene copolymer rubber, chlorosulfonated polyethylene, isobutylene polymer rubber and ethylene.vinyl acetate copolymer rubber.

As the acrylic rubber, any one of the conventionally known acrylic rubbers can be used. Examples include acrylic rubbers available by copolymerizing one or two or more monomers composed of ethyl acrylate and/or butyl acrylate with a small amount of at least one further monomer such as 2-chloroethylvinyl ether, methyl vinyl ketone, acrylic acid, acrylonitrile or butadiene.

As the fluorine rubber, any one of the conventionally known fluorine rubbers can be used. Specific examples include trifluorochloroethylene.vinylidene fluoride copolymer rubber, hexafluoropropylene.vinylidene fluoride copolymer rubber and butyl perfluoroacrylate copolymer rubber.

In the thermoplastic polymer composition of the present invention, it is possible to use, as the crosslinked rubber (B), crosslinked products of one or two rubbers selected from natural rubber, diene polymer rubber, olefin polymer rubber, acrylic rubber and fluorine rubber.

When a crosslinked product of an isobutylene rubber such as isobutylene.isoprene copolymer rubber is used as the crosslinked rubber (B) among the above-exemplified rubbers, a polymer composition having still more improved gas barrier properties can be obtained. When a halogenated isobutylene.isoprene copolymer rubber and/or isobutylene-.halogenated p-methyl styrene copolymer rubber are(is) used as the crosslinked rubber (B), the compatibility of the block copolymer (A) and the crosslinked rubber (B) is improved. Accordingly, during melt kneading, the crosslinked rubber (B) is finely dispersed in the block copolymer (A) and its morphology becomes stable, which makes it possible to obtain a polymer composition having still more improved mechanical properties and gas barrier properties.

The crosslinked rubber (B) contained in the thermoplastic polymer composition of the present invention can be obtained by crosslinking one or two or more of the above rubbers prior to mixing with the block copolymer (A) or by adding—upon preparation of the thermoplastic polymer composition of the present invention by melt mixing the block copolymer (A) with the above-described rubber—a crosslinking agent conventionally used for rubber, thereby dynamically crosslinking the rubber.

No particular limitation is imposed on the crosslinking agent for obtaining the crosslinked rubber (B). Any one of the crosslinking agent conventionally used for rubber can be used. Examples of the crosslinking agent for obtaining the crosslinked rubber (B) include, but not limited to, sulfur, organic sulfur compounds, organic nitroso compounds such aromatic nitroso compound, oxime compounds, metal oxides such as zinc oxide or magnesium oxide, polyamines, selenium and tellurium and/or compounds thereof, various organic peroxides and resinous crosslinking agents such as alkylphenol formaldehyde resin or brominated alkylphenol formaldehyde resin. According to the kind of the rubber, one or two or more crosslinking agents can be used. It is generally preferred to use the crosslinking agent in an amount of 0.5 to 30 parts by weight based on 100 parts by weight of the rubber in order to obtain the crosslinked rubber (B), with 0.5 to 20 parts by weight being more preferred.

Upon obtaining the crosslinked rubber (B), it is possible to use one or two crosslinking assistants together with the above-described crosslinking agent as needed. Examples of the crosslinking assistant include guanidine compounds such as diphenyl guanidine, aldehyde amine compounds, aldehyde ammonium compounds, thiazole compounds, sulfenamide compounds, thiourea compounds, thiuram compounds and dithiocarbamate compounds.

In addition to the above-described crosslinking agent and crosslinking assistant, it is also possible to use, upon obtaining the crosslinked rubber (B), compounds such as divinylbenzene, trimethylolpropane triacrylate, zinc powder, N,N-m-phenylene bismaleimide, metal halides, organic halides, maleic anhydride, glycidyl methacrylate, hydroxypropyl methacrylate and stearic acid as needed.

Although no particular limitation is imposed, when the crosslinked rubber (B) is a crosslinked product of an ethylene.propylene.diene copolymer rubber (EPDM), a thermoplastic polymer composition having excellent heat resistance can be obtained by using the crosslinked product of an ethylene.propylene.diene copolymer rubber (EPDM) after it is adjusted by adding 1 to 10 parts by weight of an organic peroxide based on 100 parts of the rubber.

When the crosslinked rubber (B) is a crosslinked product of an isobutylene rubber such as isobutylene.isoprene copolymer rubber, it is preferred to use the crosslinked product after adjusting it by adding, based on 100 parts by weight of the rubber, 1 to 20 parts by weight of an alkylphenol formaldehyde resin or reaction-type brominated alkylphenol formaldehyde resin as a crosslinking agent and tin chloride ($SnCl_2.H_2O$; crosslinking assistant) as a crosslinking assistant.

The thermoplastic polymer composition according to the present invention is required to contain the block copolymer (A) and the crosslinked rubber (B) at a weight ratio of 90:10 to 10:90, with a weight ratio of 20:80 to 80:20 being preferred and with 30:70 to 70:30 being more preferred.

Contents of the block copolymer (A) exceeding 90 wt. % [contents of the crosslinked rubber (B) less than 10 wt. %], based on the total weight of the block copolymer (A) and the crosslinked rubber (B), increase the compression set and permanent set of the polymer composition, which prevents the polymer composition from being imparted with good rubber elasticity or elastic recovery, resulting in the deterioration in the hermetically sealing properties. When the content of the block copolymer (A) is less than 10 wt. % [the content of the crosslinked rubber (B) exceeds 90 wt. %], the polymer composition has heightened melt viscosity so that sufficient melt fluidity cannot be obtained upon molding or forming, resulting in poor moldability or formability.

When a thermoplastic polymer composition comprising the block copolymer (A) and the crosslinked rubber (B) is prepared by adding a crosslinking agent at the time of melt mixing (for example, at the time of melt kneading) of the block copolymer and the rubber, it is necessary to control the ratio of [weight of the block copolymer (A)] to [(weight of the rubber before crosslinking)+(weight of crosslinking agent)] to fall within a range of from 90:10 to 10:90, with a range of from 80:20 to 20:80 being more preferred.

In the thermoplastic polymer composition according to the present invention, either in the case where the crosslinked rubber (B) prepared in advance (the rubber crosslinked in advance) is mixed with the block copolymer (A) or in the case where the rubber is crosslinked at the same time with the melt mixing of the block copolymer and rubber, the amount of a gel in the thermoplastic polymer composition, that is, the amount of gel represented by the below-described equation (1) is preferably 20 to 80%, more preferably 25 to 75%.

By controlling the amount of the gel of the thermoplastic polymer composition to 20 to 80%, the crosslinked rubber (B) can be contained in the block copolymer (A) in the stable morphology, which improves the moldability or formability and at the same time, reduces the compression set of the thermoplastic polymer composition furthermore. In addition, by controlling the amount of the gel within the above range, a thermoplastic polymer composition which has a compressive deformation strain not greater than 70% can be prepared easily, said compressive deformation strain being measured by allowing the composition stand under the conditions of an atmospheric temperature of 70° C. and a compressive deformation amount of 25% for 22 hours in accordance with JIS-K6301 which will be described later.

$$\text{Amount of the gel } (\%) = (Wc/Wu) \times 100 \quad (1)$$

wherein Wc represents the weight (g) of the insoluble content of the thermoplastic polymer composition in cyclohexane and Wu represents the weight (g) of the thermoplastic polymer composition.

In the above equation (1), the weight (Wc) of the insoluble content of the thermoplastic polymer composition in cyclohexane and weight (Wu) of the thermoplastic polymer composition are determined as follows:

In either case where the thermoplastic polymer composition is prepared by only mixing the block copolymer (A) with the crosslinked rubber (B) which has already been obtained or where the thermoplastic polymer composition is :prepared by mixing the block copolymer (A) with an uncrosslinked rubber and then dynamically crosslinking the rubber simultaneously with melt mixing of these two components, first, a predetermined amount of the thermoplastic polymer composition is measured as Wu (g). Then, Wu (g) of the thermoplastic polymer composition is charged in cyclohexane and the temperature is kept at 80° C. for 12 hours. Then, the insoluble content in cyclohexane is collected by filtration and dried. The weight of the dried insoluble content in cyclohexane is measured, which is designated as the weight (Wc) (g) of the insoluble content of the thermoplastic polymer composition in cyclohexane. From the above equation (1), the amount of the gel (%) in the thermoplastic polymer composition is determined.

Even in the latter case where the crosslinking of the rubber is carried dynamically at the same time with the melt mixing of the block copolymer (A), the block copolymer (A)

is, in general, almost completely soluble in cyclohexane which is a good solvent for the block copolymer (A) so that similar to the former case where the crosslinked rubber (B) prepared in advance is mixed with the block copolymer (A), the amount of the gel of the thermoplastic polymer composition can be determined almost correctly by the above equation (1).

Either in the former or latter case, the crosslinking of the rubber can be controlled so as to attain sufficient crosslinking by measuring the amount of the gel as needed during the crosslinking reaction of the rubber, thereby checking the proceeding degree of the crosslinking reaction.

The thermoplastic polymer composition according to the present invention is preferred to have the following morphology when observed by a transmission electron microscope:

(a) the crosslinked rubber (B) is dispersed in a continuous phase of the block copolymer (A); or (b) the block copolymer (A) and the crosslinked rubber (B) form a co-continuous phase.

In general, the morphology of (a) is formed in the polymer composition which contains the block copolymer (A) at a higher ratio, while that of (b) is formed in the polymer composition which contains the crosslinked rubber (B) at a higher ratio.

The term "the block copolymer (A) and the crosslinked rubber (B) form a co-continuous phase" as used herein means that the block copolymer (A) and the crosslinked rubber (B) exist, forming a continuous boundary (line) without forming an island-like dispersion (spotted dispersion) of the crosslinked rubber (B) in the continuous phase of the block copolymer (A) or, on the contrary, forming an island-like dispersion (spotted dispersion) of the block copolymer (A) in the continuous phase of the crosslinked rubber (B).

When the thermoplastic polymer composition has the above-described morphology (a) or (b), it has improved moldability or formability and molded products with a small compression set and permanent set can be produced. At this time, when the crosslinked rubber (B) has a particle size of preferably 10 μm or less, more preferably 0.1 to 10 μm, still more preferably 0.1 to 5 μm, molded or formed products particularly excellent in the above described properties can be obtained.

If different from the above-described morphology of (a) or (b), the block copolymer (A) is dispersed in a continuous phase of the crosslinked rubber (B), the polymer composition has a reduced melt fluidity and the molded or formed products available by melt molding or forming of such a composition tend to have deteriorated physical properties.

The morphology of the thermoplastic polymer composition is influenced by the content of the components such as block copolymer (A), crosslinked rubber (B), crosslinking agent or additive, melt mixing method or melt mixing conditions upon preparation of the thermoplastic polymer composition, or the like. For example, it is often difficult to find a definite transition point from the above-described morphology (a) to (b) because a change in the morphology due to a change in the content of the crosslinked rubber (B) appears continuously. It is therefore preferred to prepare the polymer composition by adjusting the above-described points to have either one of the morphology (a) or (b).

The thermoplastic polymer composition of the present invention may contain a softener as needed in order to bring about a further improvement in the formability or moldability and flexibility. Examples of the softener usable in the present invention include extender oil (high-boiling point petroleum component classified as paraffin, naphthene or aromatic type) and liquid polyisobutene which are used for improving processability and extending effects upon processing of a rubber and for improving the dispersibility of a filler. The softener is preferably used in an amount of 10 to 300 parts by weight based on 100 parts by weight of the total amount of the block copolymer (A) and crosslinked rubber (B), with 20 to 150 parts by weight being more preferred. No particular limitation is imposed on the adding time of a softener, but it is preferred to carry out the addition of the softener simultaneously with the melt mixing of the block copolymer (A) and crosslinked rubber (B).

In addition, the thermoplastic polymer composition of the present invention may contain an inorganic filler as needed within an extent not impairing the advantages of the present invention. The addition of an inorganic filler reduces the product cost by its extending effects and in some cases, is useful for the improvement of the quality of the polymer composition. Examples of the inorganic filler include calcium carbonate, carbon black (channel black, furnace combustion black), talc, magnesium hydroxide, mica, barium sulfate, natural silicic acid, white carbon and titanium oxide. These inorganic fillers may be used either singly or in combination. When an inorganic filler is added to the thermoplastic polymer composition of the present invention, it is preferred to use the inorganic filler in an amount not greater than 300 parts by weight based on 100 parts by weight of the total weight of the block copolymer (A) and crosslinked rubber (B), with 20 to 200 parts by weight being more preferred.

The thermoplastic polymer composition of the present invention may also contain an olefin resin for the purpose of improving the moldability or formability, oil resistance and mechanical properties. Examples of the olefin resin include homopolymers of an α-olefin, such as polyethylene, ethylene-vinyl acetate copolymer, poly(1-butene), poly(4-methyl-1-pentene), copolymers of ethylene and one or more α-olefins, and copolymers of ethylene and/or an α-olefin, as a main component, with a vinyl ester, unsaturated carboxylic acid or derivative thereof. These olefin resins may be used either singly or in combination. When the olefin resin is added to the thermoplastic polymer composition of the present invention, it is preferred to use it in an amount not greater than 200 parts by weight based on 100 parts by weight of the total amount of the block copolymer (A) and crosslinked rubber (B), with 5 to 100 parts by weight being more preferred.

The thermoplastic polymer composition of the present invention may contain one or two or more additives other than the above-described ones, for example, pigment, coloring agent, flame-retardant, ultraviolet absorber, antioxidant, antistatic agent, lubricant or mold releasing agent such as silicone oil within an extent not impairing the advantages of the present invention.

No particular limitation is imposed on the preparing process of the thermoplastic polymer composition of the present invention. Any one of the processes which permit the uniform mixing of the block copolymer (A), the crosslinked rubber (B) and optionally the above-described components can be adopted. In particular, the preparation process which can form the above-described morphology (a) or (b) is desired.

When the thermoplastic polymer composition is prepared by preparing the crosslinked rubber (B) in advance and then mix it (B) with the block copolymer (A), the processes as exemplified below, but not limited thereto, are preferably adopted.

The thermoplastic polymer composition of the present invention is prepared, for example, by adding a crosslinking agent to the above-described rubber, kneading them at a proper temperature by using a kneader or the like ordinarily used for the preparation of a crosslinked rubber, allowing the crosslinking reaction of the kneaded mass so obtained to proceed by using a pressing machine or the like at a proper crosslinking temperature for a proper crosslinking time, cooling the mass by liquid nitrogen, pulverizing the mass into crosslinked rubber (B), and melt mixing the crosslinked rubber (B) so obtained with the block copolymer (A).

Upon preparation, as the melt mixing method of the crosslinked rubber (B) with the block copolymer (A), any one of the conventionally known and used method for the preparation of a thermoplastic polymer composition can be employed. Examples include single screw extruder, twin screw extruder, Banbury mixer and other melt kneading apparatuses. It is preferred to set the melt kneading temperature at about 150 to 250° C. The thermoplastic polymer composition so obtained can be formed into pellets or other forms as needed.

When the thermoplastic polymer composition of the present invention is prepared by carrying out dynamic crosslinking of a rubber simultaneously with the melt kneading of the block copolymer (A) and the rubber, thereby forming the rubber into the crosslinked rubber (B), the below-described method can be adopted preferably.

When the thermoplastic polymer composition of the present invention is prepared by using an internal kneader or batch kneader, such as Brabender, Banbury mixer, kneader or roll, adopted is a process in which all the components except a crosslinking agent are melt kneaded until they form a uniform mixture, the crosslinking agent is added to the resulting mixture and then, melt kneading is terminated at the time when crosslinking reaction is effected sufficiently. Concerning the melt kneading time after the addition of the crosslinking agent, it is preferred for sufficient crosslinking of the rubber to continue kneading until it is confirmed that the torque value and current value of the motor of the kneader each shows a marked increase and indicate the maximum value after the addition of the crosslinking agent, starts decreasing and then becomes stable at a predetermined value.

When the thermoplastic polymer composition of the present invention is prepared using a continuous type melt kneader such as single screw extruder or twin screw extruder, usable are a process in which the thermoplastic polymer composition containing the block copolymer (A) and the crosslinked rubber (B) is prepared by melt kneading all the components except the crosslinking agent in advance in a melt kneader such as extruder, pelletizing the kneaded mass, dry-blending the crosslinking agent with the pellets so obtained, and melt kneading the resulting mixture in a melt kneader such as extruder to dynamically crosslink the rubber; and a process in which the thermoplastic polymer composition containing the block copolymer (A) and the crosslinked rubber (B) is prepared by melt kneading all the components except the crosslinking agent in a melt kneader such as extruder, adding the crosslinking agent to the kneaded mass at some portion of the cylinder of the extruder and melt kneading the resulting mixture, thereby dynamically crosslinking the rubber.

Temperature of 150 to 250° C. is preferred in the case of the above-described process in which dynamic crosslinking is carried out simultaneously with melt kneading.

The polymer composition of the present invention is thermoplastic and therefore can be formed or molded by the method and apparatus generally employed for the thermoplastic polymer composition. Various molded or formed products having any shape or size can be produced by melt molding or forming, more specifically, by injection molding, extrusion, press molding or blow molding of the composition.

The thermoplastic polymer composition according to the present invention can be used effectively for the production of general-purpose molded or formed products such as band or grip, and hermetically sealing materials such as sealant, packing material or gasket, making use of its excellent properties such as moldability or formability, gas barrier properties, compression set resistance, hermetically sealing properties, sealing properties, flexibility, mechanical properties, oil resistance, safety and hygienic properties.

In particular, the thermoplastic polymer composition of the present invention can be used effectively as hermetically sealing materials for medical tools, for example, stopper for pharmaceutical container, gasket for syringe, sealing or packing material for vacuum blood collecting tube; and hermetically sealing materials in the food-related field (for example, various hermetically sealing materials for the food producing machine or for containers for preserving or packing food). The shape, structure or size of the above-exemplified hermetically sealing material can be designed as desired according to its application.

EXAMPLES

The present invention will hereinafter be described more specifically by examples. It should however be borne in mind that the present invention is not limited to or by the examples. In the Examples which will be described below, the amount of the gel in the polymer composition, morphology of the polymer composition, moldability or formability and surface hardness of the molded or formed product available from the polymer composition, tensile strength at break, tensile elongation at break, 100% modulus, permanent set, compression set and gas permeability were measured or evaluated as described below. In addition, the evaluation of liquid leakage, coring performance and liquid leakage after needle insertion concerning the stopper available from the polymer composition; and test or measurement of the foaming property, $\Delta$ pH, $\Delta$ potassium permanganate consumption amount, and evaporation residue amount concerning a gasket for syringe available from the polymer composition were carried out as described below.

(1) Amount of the Gel in the Polymer Composition:

In 500 ml of cyclohexane, 1 g (Wu) of the polymer composition was charged, followed by stirring under heat at 80° C. for 12 hours. The insoluble content was then filtered through a glass filter (G4: average pore size of 5 to 10 $\mu$m) and vacuum-dried at 60° C. The weight of the insoluble content (Wc) (g) after drying was measured and the amount (%) of the gel in the polymer composition was found from the weight (Wc) (g) of the insoluble content relative to the weight (Wu) of the polymer composition in accordance with the above equation (1).

(2) Morphology in the Polymer Composition:

From the pellet of the polymer composition, a thin section was cut out using a microtome ("FCS" produced by RESFHERT JUNG) and it was dyed with $RuO_4$. Its morphology was observed using a transmission electron microscope ("H-7100FA", produced by Hitachi Ltd.)

(3) Moldability or Formability of the Polymer Composition:

The polymer composition was press molded under the conditions of a temperature of 200° C. and pressing pressure of 100 kg/cm$^2$, whereby a molded product of 20 cm wide, 20 cm long and 1 mm thick was produced in the form of a sheet. The fluidity and surface conditions of the polymer composition upon molding were observed visually and evaluated according to the evaluation standards as described below in Table 1.

TABLE 1

[Evaluation standards of moldability]

o: The molten polymer composition has good fluidity so that it is molded into a product of the same shape and same size with those of the press mold and moreover, the molded product has a smooth surface.
Δ: The molten polymer composition has good fluidity so that it is molded into a product of the same shape and same size with those of the press mold, but the molded product does not have a smooth surface.
X: The molten polymer composition has a high viscosity and poor fluidity so that it cannot be molded into a product of the same shape and same size with those of the press mold.

(4) Surface Hardness:

The polymer composition was press molded under the conditions of a temperature of 200° C. and pressing pressure of 100 kg/cm2, whereby a molded product of 20 cm wide, 20 cm long and 1 mm thick was produced in the form of a sheet. The surface hardness of the polymer composition was measured in accordance with JIS-K6301.

(5) Tensile Strength at Break, Tensile Elongation at Break, 100% Modulus and Permanent Set:

The polymer composition was press molded under the conditions of a temperature of 200° C. and pressing pressure of 100 kg/cm$^2$, whereby a molded product of 20 cm wide, 20 cm long and 1 mm thick was produced in the form of a sheet. From the sheet-like molded product so obtained, No. 3 dumb-bell test pieces were punched out using a punch die. The tensile strength at break, tensile elongation at break, 100% modulus and permanent set were measured using the dumbbell test pieces in accordance with JIS-K6301.

(6) Compression Set:

The polymer composition was press molded under the conditions of a temperature of 200° C. and pressing pressure of 100 kg/cm$^2$, whereby a molded product of 20 cm wide, 20 cm long and 1 mm thick was produced in the form of a sheet. Compressive deformation strain of the sheet-like molded product at the time when it was allowed to stand under the conditions of a temperature of 70° C. and a compressive dedance with JIS-K6301.

(7) Gas Permeability:

The polymer composition was press molded under the conditions of a temperature of 200° C. and pressing pressure of 100 kg/cm$^2$, whereby a film of 20 μm thick was prepared. The oxygen gas permeation coefficient of the resulting film was measured in accordance with ASTM D3985 by using a gas permeability tester ("GTR-10" produced by Yanagimoto Co., Ltd.), whereby gas permeability was evaluated.

(8) Evaluation of the Performance of a Stopper:

(i) Liquid Leakage Resistance:

The polymer composition was press molded under the conditions of a melting temperature of 200° C. and a pressing pressure of 100 kg/cm$^2$, whereby a stopper of 2 cm in diameter and 2 cm in length was produced in the form of a column. After 500 ml of water were filled in a transparent, glass-made bottle having an internal volume of 500 ml, the stopper was inserted into the mouth portion of the bottle for hermetic sealing. After placed in a pressure oven and heated at 120° C. for 60 minutes, it was taken out from the oven and the presence or absence of liquid leakage at the mouth portion of the bottle was visually observed.

(ii) Coring Property:

In a similar manner to the above (i), a columnar stopper of 2 cm in diameter and 2 cm in length was produced. After 500 ml of water were filled in the same transparent, glass-made bottle with that used in (i), the stopper was inserted into the mouth portion of the bottle for hermetic sealing, followed by screwing an aluminum cap over the stopper. The central portion was removed from the aluminum cap and a standard injection needle (22G) was inserted from the center of the stopper. The insertion of the needle was repeated ten times with changing the position to be inserted. Based on the number of the polymer composition pieces which were removed from the stopper by the insertion of the needle and were floating in water, coring property was evaluated. In the evaluation of the coring property, the less the number of the polymer composition pieces floating in water, the better the coring property.

(iii) Liquid Leakage after Insertion of a Needle:

In a similar manner to the above (i), a columnar stopper of 2 cm in diameter and 2 cm in length was produced. After 500 ml of water were filled in the same transparent, glass-made bottle with that used in (i), the stopper was inserted into the mouth portion of the bottle for hermetic sealing. From the outside surface of the stopper, an injection needle (22G) and an air needle were inserted separately. The bottle was stood upside down and water was discharged from the bottle through the injection needle until water in the bottle decreased to 150 ml. The presence or absence of the discharge of water was visually observed at the time when the needle was taken out from the stopper and liquid leakage after needle insertion was evaluated. In the evaluation of the liquid leakage after needle insertion, when the stopper is free from water leakage at the time or after the injection needle is taken out from the stopper, it is evaluated to have good sealing property after needle insertion.

(9) Evaluation of the Performance of a Gasket for Syringe:

The polymer composition was press molded under the conditions of a temperature of 200° C. and pressing pressure of 100 kg/cm$^2$, whereby a gasket for syringe having the shape (cross-sectional view) as indicated at numeral 1 in FIG. 1 was produced. The gasket fixed to the end of an operation rod (piston rod) as shown in FIG. 1 was inserted into the inside of the outer cylinder (volume: 10 ml, average inner diameter: 15.5 mm, made of polypropylene) (not illustrated) of a syringe (injector). By using the syringe produced as described above, foaming property, Δ pH, Δ potassium permanganate consumption amount and evaporation residue amount were tested or measured in accordance with the testing method of an eluted substance as described in "Testing method of a rubber stopper for infusion" specified in The 12-th edition of the Japanese Pharmacopoeia.

(i) Foaming property: In this foaming property test, the shorter the defoaming time, the better foaming resistance. The syringe which has a foaming property within 3 minutes is qualified as a gasket for syringe.

(ii) Δ pH: In this test, the smaller the value of Δ pH, the less the elution from the gasket 1 for syringe and the higher the safety. The syringe whose ΔpH is not higher than ±1.0 is qualified as a gasket for medical syringe.

(iii) Δ Potassium permanganate consumption amount: In this test, the less the consumption amount of potassium manganate, the less the elution from the gasket 1 for syringe and the higher the safety. The syringe which has a Δ potassium permanganate consumption amount not greater than 2.0 ml is qualified as a gasket for medical syringe.

(iv) Evaporation residue amount: In this test, the less the evaluation residue amount, the less the elution from the gasket 1 for syringe and the higher the safety. The syringe having an evaporation residue amount of 2.0 mg is qualified as a gasket for medical syringe.

The abbreviations and specification of the materials used in examples and comparative examples are described below:

(1) SIBS:

Triblock copolymer of polystyrene, polyisobutylene and polystyrene [number-average molecular weight=34000, molecular weight distribution (Mw/Mn)=1.1, styrene unit content=30 wt. %]

(2) H-SIPS:

Hydrogenated triblock copolymer of polystyrene, polyisoprene and polystyrene [number-average molecular weight=40000, molecular weight distribution (Mw/Mn)= 1.1, styrene unit content=30 wt. %, hydrogenation ratio of isoprene unit: 95% (amounts of a 1,4-bond and 3,4-bond in the polyisoprene block prior to hydrogenation: 92% and 8%, respectively)]

(3) IIR(1):

Isobutylene.isoprene copolymer rubber [unsaturation degree: low, Mooney viscosity=45 (ML 1+4 (100° C.)); "JSR Butyl 065" produced by Nippon Synthetic Rubber Co., Ltd.]

(4) IIR(2):

Isobutylene.isoprene copolymer rubber [unsaturation degree: medium, Mooney viscosity=51 (ML 1+8 (125° C.)); "JSR Butyl 268" produced by Nippon Synthetic Rubber Co., Ltd.]

(5) IIR(3):

Isobutylene.isoprene copolymer rubber [unsaturation degree: high, Mooney viscosity=47 (ML 1+4 (100° C.)); "JSR Butyl 365" produced by Nippon Synthetic Rubber Co., Ltd.]

(6) Br-IIR:

Brominated isobutylene.isoprene copolymer rubber [bromine content=2%, Mooney viscosity=46 (ML 1+8 (125° C.)); "JSR Bromo Butyl 2244" produced by Nippon Synthetic Rubber Co., Ltd.]

(7) EPDM:

Ethylene.propylene.diene copolymer rubber [Mooney viscosity=42 (ML 1+4 (100° C.)), bromine number=15; "EP 22" produced by Nippon Synthetic Rubber Co., Ltd.]

(8) SBR:

Styrene.butadiene copolymer rubber [styrene content=24 wt. %, Mooney viscosity=32 (ML 1+4 (100° C.)); "JSR SL556" produced by Nippon Synthetic Rubber Co., Ltd.]

(9) Br-APH:

Reaction type brominated alkylphenol formaldehyde compound (specific gravity=1.06 to 1.08, softening point= 75 to 95° C., "Tacky Roll 25-1" produced by Taoka Chemical Co., Ltd.)

(10) ZnO

Zinc oxide ("Zinc oxide No. 1" product of Hakusui Chemical Industries, Ltd.)

EXAMPLE 1

(1) A polystyrene-polyisobutylene-polystyrene triblock copolymer (SIBS) and isobutylene.isoprene copolymer rubber [IIR(1)], each in the form of pellets, were dry-blended at a weight ratio of 20:80. To 100 parts by weight of the resulting blend, 4.0 parts by weight of ZnO and 0.8 part by weight of stearic acid were added, followed by melt-kneading at a cylinder temperature of 170° C. and a screw revolution speed of 150 rpm by using a twin screw extruder ("BT-30", product of Plastic Kogyo Kenkyujo). The kneaded mass was then pelletized to form pellets.

(2) With 100 parts by weight of the pellets obtained in the above (1), 8 parts by weight of a reaction-type brominated alkylphenol formaldehyde compound (Br-APH) were dry-blended, followed by melt kneading at the same temperature by using the same biaxial extruder, whereby the polymer composition was prepared in the form of pellets.

(3) By using the pellets of the polymer composition obtained in the above (2), the amount of the gel of the crosslinked rubber (B) contained in the polymer composition and morphology of the polymer composition were measured and observed in accordance with the above-described methods, respectively. The results are shown in Table 2.

(4) From the pellets of the polymer composition obtained above in (3), a sheet, film, stopper and gasket for syringe to be used for the test of physical properties were produced by press molding in accordance with the above-described methods, respectively. The moldability or formability; surface hardness, tensile strength at break, tensile elongation at break, 100% modulus, permanent set, compression set and gas permeability of the molded or formed product; liquid leakage resistance, coring property and liquid leakage after needle insertion concerning the stopper; and foaming property, Δ pH, Δ potassium manganate consumption amount and evaporation residue amount of the gasket for syringe were tested or measured in accordance with the above-described methods. The results are shown in Table 2.

EXAMPLE 2

(1) In a similar manner to (1) of Example 1 except that the dry blending ratio of the polystyrene-polyisobutylene-polystyrene triblock copolymer (SIBS) and isobutylene.isoprene copolymer rubber [IIR(1)], each in the form of pellets, was changed to 50:50 (weight ratio), the amount of ZnO was changed to 2.5 parts by weight and the amount of stearic acid was changed to 0.5 part by weight; and in a similar manner to (2) of Example 1 except that the blending amount of the reaction-type brominated alkylphenol formaldehyde compound (Br-APH) was changed to 5 parts by weight, the polymer composition was prepared in the form of pellets.

(2) By using the pellets of the polymer composition obtained above in (1), the amount of the gel of the crosslinked rubber (B) contained in the polymer composition and the morphology of the polymer composition were measured and observed, respectively in accordance with the above-described methods. In addition, by using the pellets of the polymer composition, tests of various physical properties were carried out in a similar manner to (4) of Example 1. The results are shown in Table 2.

EXAMPLE 3

In a similar manner to (1) of Example 1 except that the dry blending ratio of the polystyrene-polyisobutylene-polystyrene triblock copolymer (SIBS) and isobutylene.isoprene copolymer rubber [IIR(1)], each in the form of pellets, was changed to 80:20 (weight ratio), the amount of ZnO was changed to 1.0 part by weight and the amount of stearic acid was changed to 0.2 part by weight; and in a similar manner to (2) of Example 1 except that the blending amount of the reaction-type brominated alkylphenol formaldehyde compound (Br-APH) was changed to 2 parts by weight, the polymer composition was prepared in the form of pellets.

(2) By using the pellets of the polymer composition obtained above in (1), the amount of the gel of the crosslinked rubber (B) contained in the polymer composition and the morphology of the polymer composition were measured and observed, respectively in accordance with the above-described methods. In addition, by using the pellets of the polymer composition, tests of various physical properties were carried out in a similar manner to (4) of Example 1. The results are shown in Table 2.

EXAMPLE 4

(1) A polystyrene-polyisobutylene-polystyrene triblock copolymer (SIBS) and isobutylene.isoprene copolymer rubber [IIR(1)], each in the form of pellets, were dry-blended at a weight ratio of 50:50. To 100 parts by weight of the resulting blend, 1.5 parts by weight of ZnO and 0.5 parts by weight of stearic acid were added. The resulting mixture was melt-kneaded and pelletized in a similar manner to (1) of Example 1, whereby pellets were prepared.

(2) With 100 parts by weight of the pellets obtained above in (1), 0.5 part by weight of tetramethylthiuram disulfide and 1 part by weight of sulfur were dry-blended, followed by melt kneading and pelletization in a similar manner to (2) of Example 1, whereby the polymer composition was prepared in the form of pellets.

(3) By using the pellets of the polymer composition obtained above in (2), the amount of the gel in the crosslinked rubber (B) contained in the polymer composition and morphology of the polymer composition were measured and observed, respectively in accordance with the above-described methods. In addition, by using the pellets of the polymer composition obtained above in (2), tests of various physical properties were carried out in a similar manner to (4) of Example 1. The results are shown in Table 2.

EXAMPLE 5

(1) A polystyrene-polyisobutylene-polystyrene triblock copolymer (SIBS) and isobutylene.isoprene copolymer rubber [IIR(2)], each in the form of pellets, were dry-blended at a weight ratio of 50:50. To 100 parts by weight of the resulting blend, 2.5 parts by weight of ZnO and 0.5 parts by weight of stearic acid were added. The resulting mixture was melt-kneaded and pelletized in a similar manner to (1) of Example 1, whereby pellets were prepared.

(2) With 100 parts by weight of the pellets obtained above in (1), 5 parts by weight of a reaction-type brominated alkylphenol formaldehyde compound (Br-APH) were dry-blended, followed by melt kneading and pelletization in a similar manner to (2) of Example 1, whereby the polymer composition was prepared in the form of pellets.

(3) By using the pellets of the polymer composition obtained above in (2), the amount of the gel in the crosslinked rubber (B) contained in the polymer composition and morphology of the polymer composition were measured and observed, respectively in accordance with the above-described methods. In addition, by using the pellets of the polymer composition obtained above in (2), tests of various physical properties were carried out in a similar manner to (4) of Example 1. The results are shown in Table 3.

EXAMPLE 6

(1) As in (1) and (2) of Example 5 except that 50 parts by weight of isobutylene.isoprene copolymer rubber [IIR(2)] were replaced by 50 parts by weight of isobutylene.isoprene copolymer rubber [IIR(3)], the polymer composition was prepared in the form of pellets.

(2) By using the pellets of the polymer composition obtained above in (1), the amount of the gel in the crosslinked rubber (B) contained in the polymer composition and morphology of the polymer composition were measured and observed, respectively in accordance with the above-described methods. In addition, by using the pellets of the polymer composition obtained above in (1), tests of various physical properties were carried out in a similar manner to (4) of Example 1. The results are shown in Table 3.

EXAMPLE 7

(1) As in (1) and (2) of Example 5 except that 50 parts by weight of isobutylene.isoprene copolymer rubber [IIR(2)] were replaced by 50 parts by weight of ethylene.propylene.diene copolymer rubber [EPDM], the polymer composition was prepared in the form of pellets.

(2) By using the pellets of the polymer composition obtained above in (1), the amount of the gel in the crosslinked rubber (B) contained in the polymer composition and morphology of the polymer composition were measured and observed, respectively in accordance with the above-described methods. In addition, by using the pellets of the polymer composition obtained above in (1), tests of various physical properties were carried out in a similar manner to (4) of Example 1. The results are shown in Table 3.

EXAMPLE 8

(1) A polystyrene-polyisobutylene-polystyrene triblock copolymer (SIBS) and brominated isobutylene.isoprene copolymer rubber (Br-IIR), each in the form of pellets, were dry-blended at a weight ratio of 50:50. To 100 parts by weight of the resulting blend, 0.5 part by weight of stearic acid was added, followed by melt kneading and pelletization in a similar manner to (1) of Example 1, whereby pellets were obtained.

(2) With 100 parts by weight of the pellets obtained above in (1), 2.5 parts by weight of ZnO were dry-blended, followed by melt kneading and pelletization in a similar manner to (2) of Example 1, whereby the polymer composition was prepared in the form of pellets.

(3) By using the pellets of the polymer composition obtained above in (2), the amount of the gel in the crosslinked rubber (B) contained in the polymer composition and morphology of the polymer composition were measured and observed, respectively in accordance with the above-described methods. In addition, by using the pellets of the polymer composition obtained above in (2), tests of various physical properties were carried out in a similar manner to (4) of Example 1. The results are shown in Table 3.

EXAMPLE 9

(1) A polystyrene-polyisobutylene-polystyrene triblock copolymer (SIBS) and styrene.butadiene copolymer rubber (SBR), each in the form of pellets, were dry-blended at a weight ratio of 50:50. To 100 parts by weight of the resulting mixture, 1.5 parts by weight of ZnO and 0.5 part by weight of stearic acid was added, followed by melt kneading and pelletization in a similar manner to (1) of Example 1, whereby pellets were obtained.

(2) To 100 parts by weight of the pellets obtained above in (1), 0.5 part by weight of tetramethylthiuram disulfide and 1 part by weight of sulfur were dry-blended, followed by melt kneading and pelletization in a similar manner to (2) of Example 1, whereby the polymer composition was prepared in the form of pellets.

(3) By using the pellets of the polymer composition obtained above in (2), the amount of the gel in the crosslinked rubber (B) contained in the polymer composition and morphology of the polymer composition were measured and observed, respectively in accordance with the above-described methods. In addition, by using the pellets of the polymer composition obtained above in (2), tests of various physical properties were carried out in a similar manner to (4) of Example 1. The results are shown in Table 3.

EXAMPLE 10

From the pellets obtained in Example 6, test pieces for the tests of various physical properties were formed under the conditions of a cylinder temperature of 200° C. and a mold temperature of 40° C. by using an injection molder ("FS-80", produced by Nissei Plastic Industrial Co., Ltd.), followed by measurement or test in a similar manner to (4) of Example 1. The results are shown below in Table 3.

Comparative Example 1

By using the pellets of a polystyrene-polyisobutylene-polystyrene triblock copolymer (SIBS) alone, a sheet, film, stopper and gasket for syringe to be used for the test of physical properties were produced by press molding in accordance with the above-described methods, respectively. The moldability or formability; surface hardness, tensile strength at break, tensile elongation at break, 100% modulus, elongation set, compression set and gas permeability of the molded or formed product; liquid leakage resistance, coring performance and liquid leakage after needle insertion concerning the stopper; and foaming property, $\Delta$ pH, $\Delta$ potassium manganate consumption amount and evaporation residue amount of the gasket for syringe were tested or measured in accordance with the above-described methods. The results are shown in Table 4.

Comparative Example 2

To 100 parts by weight of an isobutylene.isoprene copolymer rubber [IIR(1)], 10 parts by weight of a reaction-type brominated alkylphenol formaldehyde compound (Br-APH), 5 parts by weight of ZnO and 1 part by weight of stearic acid were added, followed by uniform mixing at 170° C. in a Cole kneader ("7700 type" produced by Irie Shokai Co., Ltd.) By using the kneaded mass, a sheet, film, stopper and gasket for syringe to be used for the test of physical properties were produced by press molding in accordance with the above-described methods (hot pressing was carried out at a pressing temperature of 170° C. until each of the molded or formed products was crosslinked sufficiently). The moldability or formability; surface hardness, tensile strength at break, tensile elongation at break, 100% modulus, elongation set, compression set and gas permeability of the molded or formed product; liquid leakage resistance, coring performance and liquid leakage after needle insertion concerning the stopper; and foaming property, $\Delta$ pH, $\Delta$ potassium manganate consumption amount and evaporation residue amount of the gasket for syringe were tested or measured in accordance with the above-described methods. The results are shown below in Table 4.

Comparative Example 3

(1) A polystyrene-polyisobutylene-polystyrene triblock copolymer (SIBS) and isobutylene.isoprene copolymer rubber [IIR(2)], each in the form of pellets, were dry-blended at a weight ratio of 50:50. The resulting blend was used without the addition of a crosslinking agent, followed by melt kneading and pelletization in a similar manner to (1) of Example 1, whereby the polymer composition was prepared in the form of pellets.

(2) By using the pellets of the polymer composition obtained above in (1), the amount of the gel in the crosslinked rubber (B) contained in the polymer composition and morphology of the polymer composition were measured and observed, respectively in accordance with the above-described methods. In addition, by using the pellets of the polymer composition obtained above in (1), tests of various physical properties were carried out in a similar manner to (4) of Example 1. The results are shown in Table 4.

Comparative Example 4

(1) In a similar manner to (1) of Example 1 except that the dry-blending ratio of the polystyrene-polyisobutylene-polystyrene triblock copolymer (SIBS) to the isobutylene.isoprene copolymer rubber [IIR(1)], each in the form of pellets, was changed to 5:95 (weight ratio), the amount of ZnO was changed to 4.75 parts by weight and the amount of stearic acid was changed to 0.95 part by weight; and in a similar manner to (2) of Example 1 except that the blending amount of the reaction-type brominated alkylphenol formaldehyde compound (Br-APH) was changed to 9.5 parts by weight, the polymer composition was obtained in the form of pellets.

(2) By using the pellets of the polymer composition obtained above in (1), the amount of the gel in the crosslinked rubber (B) contained in the polymer composition and morphology of the polymer composition were measured and observed, respectively in accordance with the above-described methods. In addition, by using the pellets of the polymer composition obtained above in (1), tests of various physical properties were carried out in a similar manner to (4) of Example 1. The results are shown in Table 4.

Comparative Example 5

(1) In a similar manner to (1) of Example 1 except that the dry-blending ratio of the polystyrene-polyisobutylene-polystyrene triblock copolymer (SIBS) to the isobutylene.isoprene copolymer rubber [IIR(1)], each in the form of pellets, was changed to 95:5 (weight ratio), the amount of ZnO was changed to 0.25 part by weight and the amount of stearic acid was changed to 0.05 part by weight; and in a similar manner to (2) of Example 1 except that the blending amount of the reaction-type brominated alkylphenol formaldehyde compound (Br-APH) was changed to 0.5 part by weight, the polymer composition was obtained in the form of pellets.

(2) By using the pellets of the polymer composition obtained above in (1), the amount of the gel in the crosslinked rubber (B) contained in the polymer composition and morphology of the polymer composition were measured and observed, respectively in accordance with the above-described methods. In addition, by using the pellets of the polymer composition obtained above in (1), tests of various physical properties were carried out in a similar manner to (4) of Example 1. The results are shown in Table 4.

Comparative Example 6

(1) A hydrogenated polystyrene-polyisoprene-polystyrene triblock copolymer (H-SIPS) and isobutylene.isoprene copolymer rubber [IIR(1)], each in the form of pellets, were dry blended at a weight ratio of 50:50. To 100 parts by weight of the resulting mixture, 2.5 parts by weight of ZnO and 0.5 part by weight of stearic acid were added, followed by the melt kneading and pelletization in a similar manner to (1) of Example 1, whereby pellets were prepared.

(2) With 100 parts by weight of the pellets obtained in (1), 5 parts by weight of a reaction-type brominated alkylphenol formaldehyde compound (Br-APH) were dry blended, followed by melt kneading and pelletization in a similar manner to (2) of Example 1, whereby pellets of the polymer composition obtained above in (1), whereby the polymer composition was prepared in the form of pellets.

(3) By using the pellets of the polymer composition obtained above in (2), the amount of the gel in the crosslinked rubber (B) contained in the polymer composition and morphology of the polymer composition were measured and observed, respectively in accordance with the above-described methods. In addition, by using the pellets of the polymer composition obtained above in (2), tests of various physical properties were carried out in a similar manner to (4) of Example 1. The results are shown in Table 4.

Comparative Example 7

A polystyrene-polyisoprene-polystyrene triblock copolymer (SIBS) and isobutylene.isoprene copolymer rubber [IIR (1)], each in the form of pellets, were dry-blended at a weight ratio of 60:40. In cyclohexane, 100 parts by weight of the resulting mixture were dissolved. To the cyclohexane solution so obtained, 2.5 parts by weight of ZnO, 0.5 part by weight of stearic acid and 5 parts by weight of a reaction-type brominated alkylphenol formaldehyde compound (Br-APH) were added and dissolved by mixing. Then, cyclohexane was evaporated and removed completely from the resulting solution. The resulting mixture was left alone at 170° C. for 20 minutes under a nitrogen atmosphere, whereby the rubber component was crosslinked statically. From the polymer composition so obtained, a sheet for the test of physical properties was tried to be produced, but the composition did not show thermoplasticity and was poor in moldability or formability so that test pieces for the test of physical properties could not be obtained.

Incidentally, it was found that when the morphology of the polymer composition after crosslinking was observed, the block copolymer (SIBS) was dispersed in a continuous phase of the crosslinked rubber.

TABLE 2

|  | Ex. 1 | Ex. 2 | Ex. 3 | Ex. 4 |
|---|---|---|---|---|
| [Composition (parts) of the polymer composition] | | | | |
| Block copolymer | | | | |
| SIBS | 20 | 50 | 80 | 50 |
| H-SIPS | | | | |
| Rubber | | | | |
| IIR (1) | 80 | 50 | 20 | 50 |
| IIR (2) | | | | |
| IIR (3) | | | | |
| Br-IIR | | | | |
| EPDM | | | | |
| SBR | | | | |

TABLE 2-continued

|  | Ex. 1 | Ex. 2 | Ex. 3 | Ex. 4 |
|---|---|---|---|---|
| Crosslinking agent and crosslinking assistant: | | | | |
| ZnO | 4.0 | 2.5 | 1.0 | 1.5 |
| Stearic acid | 0.8 | 0.5 | 0.2 | 0.5 |
| Br-APH | 8 | 5 | 2 | |
| Sulfur | | | | 1 |
| Tetramethylthiuram disulfide | | | | 0.5 |
| [Physical properties of polymer composition] | | | | |
| Amount of gel (%) | 75 | 48 | 22 | 48 |
| Morphology[1] | b | a (≦0.5 μm) | a (≦0.5 μm) | a (≦0.5 μm) |
| Moldability or formability | ○ | ○ | ○ | ○ |
| Surface hardness | 47 | 50 | 51 | 49 |
| Tensile strength at break (MPa) | 7.8 | 7.5 | 8.2 | 7.2 |
| Tensile elongation at break (%) | 700 | 550 | 670 | 590 |
| 100% modulus (MPa) | 0.8 | 0.9 | 0.9 | 0.9 |
| Permanent set (%) | 1.3 | 2.5 | 2.9 | 2.6 |
| Compression set (%) | 34 | 45 | 65 | 50 |
| Oxygen gas permeability[2] | 5800 | 6900 | 7300 | 6800 |
| [Test on the performance of stopper] | | | | |
| Liquid leakage | None | None | None | None |
| Coring property (number of Pieces) | 0 | 0 | 0 | 0 |
| Liquid leakage after needle Insertion | None | None | None | None |
| [Properties of gasket for syringe] | | | | |
| Foaming property (min) | Within 2 min | Within 1 min | Within 1 min | Within 1 min |
| Δ pH | 0.3 | 0.2 | 0.1 | 0.2 |
| Δ KMnO₄ consumption amount (ml) | 0.8 | 0.6 | 0.4 | 0.6 |
| Evaporation residue amount (mg) | 0.3 | 0.2 | 0.1 | 0.2 |

[1]Morphology
a: The crosslinked rubber is finely dispersed in the continuous phase of the block copolymer [numerals in parenthesis indicate an average particle size of the crosslinked rubber].
b: Co-contiuous phase.
c: The block copolymer is dispersed in the continuous phase of the crosslinked rubber.
[2]Unit of oxygen gas permeability constant: cc · 20 μm/m² · day · atm

TABLE 3

|  | Ex. 5 | Ex. 6 | Ex. 7 | Ex. 8 | Ex. 9 | Ex. 10 |
|---|---|---|---|---|---|---|
| [Composition (parts) of the polymer composition] | | | | | | |
| Block copolymer | | | | | | |
| SIBS | 50 | 50 | 50 | 50 | 50 | 50 |
| H-SIPS | | | | | | |
| Rubber | | | | | | |
| IIR (1) | | | | | | |
| IIR (2) | 50 | | | | | |
| IIR (3) | | 50 | | | | 50 |
| EPDM | | | 50 | | | |
| Br-IIR | | | | 50 | | |
| SBR | | | | | | 50 |

TABLE 3-continued

| | Ex. 5 | Ex. 6 | Ex. 7 | Ex. 8 | Ex. 9 | Ex. 10 |
|---|---|---|---|---|---|---|
| Crosslinking agent and crosslinking assistant: | | | | | | |
| ZnO | 2.5 | 2.5 | 2.5 | 2.5 | 1.5 | 2.5 |
| Stearic acid | 0.5 | 0.5 | 0.5 | 0.5 | 0.5 | 0.5 |
| Br-APH | 5 | 5 | 5 | | | 5 |
| Sulfur | | | | | 1 | |
| Tetramethyl-thiuram-Disulfide | | | | | 0.5 | |
| [Physical properties of polymer composition] | | | | | | |
| Amount of gel (%) | 48 | 47 | 47 | 49 | 49 | 46 |
| Morphology[1] | a (≦0.5 μm) | a (≦0.5 μm) | a (≦2 μm) | a (≦0.5 μm) | a (≦2 μm) | a (≦0.5 μm) |
| Moldability or Formability | ○ | ○ | ○ | ○ | ○ | ○ |
| Surface hardness | 49 | 50 | 50 | 48 | 48 | 50 |
| Tensile strength at Break (MPa) | 7.5 | 7.8 | 7.8 | 7.7 | 7.0 | 6.5 |
| Tensile elongation at break (%) | 540 | 510 | 500 | 490 | 420 | 350 |
| 100% modulus (MPa) | 0.9 | 0.9 | 0.9 | 0.8 | 0.8 | 0.9 |
| Permanent set (%) | 2.4 | 2.4 | 2.5 | 2.7 | 2.6 | 2.4 |
| Compression set (%) | 45 | 43 | 38 | 44 | 47 | 43 |
| Oxygen gas Permeability[2] | 6700 | 6800 | 15000 | 6800 | 17000 | 7000 |
| [Test on the performance of stopper] | | | | | | |
| Liquid leakage | None | None | None | None | None | None |
| Coring property (number of pieces) | ○ | ○ | ○ | ○ | ○ | ○ |
| Liquid leakage after Needle insertion | None | None | None | None | None | None |
| [Properties of gasket for syringe) | | | | | | |
| Foaming property (min) | Within 1 min | Within 1 min | Within 1 min | Within 1 min | Within 1 min | Within 1 min |
| Δ pH | 0.2 | 0.2 | 0.2 | 0.2 | 0.2 | 0.2 |
| Δ KMnO$_4$ consumption amount (ml) | 0.5 | 0.6 | 0.6 | 0.4 | 0.6 | 0.6 |
| Evaporation residue amount (mg) | 0.2 | 0.2 | 0.2 | 0.2 | 0.3 | 0.2 |

[1]Morphology
a: The crosslinked rubber is finely dispersed in the continuous phase of the block copolymer [numerals in parenthesis indicate an average particle size of the crosslinked rubber].
b: Co-continuous phase.
c: The block copolymer is dispersed in the continuous phase of the crosslinked rubber.
[2]Unit of oxygen gas permeability constant: cc · 20 μm/m$^2$ · day · atm

TABLE 4

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| [Composition (parts) of the polymer composition] Block copolymer | | | | | | |
| SIBS | 100 | | 50 | 5 | 95 | |
| H-SIPS | | | | | | 50 |
| Rubber | | | | | | |
| IIR (1) | | 100 | 50 | 95 | 5 | 50 |
| IIR (2) | | | | | | |
| IIR (3) | | | | | | |
| EPDM | | | | | | |
| Br-IIR | | | | | | |
| SBR | | | | | | |
| Crosslinking agent and crosslinking assistant: | | | | | | |
| ZnO | | 5 | | 4.75 | 0.25 | 2.5 |
| Stearic acid | | 1 | | 0.95 | 0.05 | 0.5 |
| Br-APH | | 10 | | 9.5 | 0.5 | 5 |
| Sulfur | | | | | | |
| Tetramethyl-thiuram-Disulfide | | | | | | |
| [Physical properties of polymer composition] | | | | | | |
| Amount of gel (%) | — | — | 0.2 | 90 | 8 | 45 |
| Morphology[1] | — | — | b | c | a (≦0.5 μm) | a (≦3 μm) |
| Moldability or Formability | ○ | X | ○ | X | ○ | ○ |
| Surface hardness | 52 | 45 | 44 | 46 | 50 | 50 |
| Tensile strength at Break (MPa) | 8.5 | 12 | 9.2 | 3.8 | 8 | 7.6 |
| Tensile elongation at Break (%) | 700 | 800 | 500 | 350 | 650 | 520 |
| 100% modulus (Mpa) | 0.9 | 0.8 | 0.8 | 0.8 | 0.9 | 1.2 |
| Permanent set (%) | 3 | 1 | 4 | 1 | 3 | 4 |
| Compression set (%) | 90 | 20 | 94 | 22 | 85 | 43 |
| Oxygen gas Permeability[2] | 8000 | 5000 | 7100 | 5100 | 8000 | 28000 |
| [Test on the performance of stopper] | | | | | | |
| Liquid leakage | Present | None | Present | None | Present | Present |
| Coring property (number of pieces) | 1 | 0 | 3 | 3 | 1 | 2 |
| Liquid leakage after Needle insertion | Present | None | Present | None | Present | Present |
| [Properties of gasket for syringe) | | | | | | |
| Foaming property (min) | Within 1 min | Within 2 min | Within 1 min | Within 2 min | Within 1 min | Within 2 min |
| Δ pH | 0.1 | 0.7 | 0.1 | 0.6 | 0.1 | 0.4 |

TABLE 4-continued

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Δ KMnO$_4$ consumption amount (ml) | 0.6 | 1.3 | 0.5 | 1 | 0.4 | 0.6 |
| Evaporation residue Amount (mg) | 0.1 | 0.8 | 0.1 | 0.8 | 0.1 | 0.4 |

[1] Morphology
a: The crosslinked rubber is finely dispersed in the continuous phase of the block copolymer [numerals in parenthesis indicate an average particle size of the crosslinked rubber].
b: Co-contiuous phase.
c: The block copolymer is dispersed in the continuous phase of the crosslinked rubber.
[2] Unit of oxygen gas permeability constant: cc · 20 μm/m$^2$ · day · atm As is apparent from Tables 2 and 3, it has been found that each of the thermoplastic polymer compositions of the present invention obtained in Examples 1 to 10 has excellent moldability or formability, has flexibility, has excellent mechanical properties typified by tensile strength at break, has small compression set and permanent set, is excellent in recovery (elastic recovery) and therefore has good hermetically sealing properties; and at the same time, has a low oxygen gas permeability and has therefore excellent gas barrier properties.

It has also been found that the stopper made of each of the thermoplastic polymer compositions obtained in Examples 1 to 10 is free from the liquid leakage and liquid leakage after needle insertion from the stopper applied and has therefore markedly excellent hermetically sealing properties; and owing to the excellent coring property, pieces of the polymer composition do not separate from the stopper when a needle is inserted into the stopper and the stopper made from the composition is markedly suited as a stopper, which is to be inserted by a needle, for a container of a medical liquid.

Furthermore, it has been found that in a syringe having a gasket, which has been manufactured using each of the thermoplastic polymer compositions obtained in Examples 1 to 10, installed at the point of an operation rod, foaming property is good; any one of Δ pH, Δ potassium permanganate consumption amount, evaporation residue amount is considerably small; and elution matters from the gasket are a few, which suggest that the composition is excellent also in safety and hygienic properties.

From the results shown in the above Table 4, on the other hand, it has been found that the polystyrene-polyisobutylene-polystyrene triblock copolymer used alone as in Comparative Example 1 has good gas barrier properties, but has large compression set and permanent set, has small elastic recovery and has poor hermetically sealing properties, which can also be confirmed from the test results on the performance of the stopper that both liquid leakage from the stopper applied and liquid leakage after needle insertion occur.

It has also been found that in the case of Comparative Example 2 in which an isobutylene.isoprene copolymer rubber was used alone, a gasket for syringe manufactured therefrom indicates a large value in each of foaming property, Δ pH, Δ potassium permanganate consumption amount and evaporation residue amount so that it is poor in safety and hygienic properties.

It has also been found that in the case of Comparative Example 3 wherein both polystryrene-polyisobutylene-polystyrene triblock copolymer and isobutylene.isoprene copolymer rubber were contained but the isobutylene.isoprene copolymer rubber had not been crosslinked, the compression set and permanent set are large, elastic recovery is small and the hermetically sealing properties are poor, which can be confirmed from the results of the performance test of the stopper such as occurrence of liquid leakage of the stopper applied and liquid leakage after needle insertion, and inferior coring property.

It has also been found that in Comparative Example 4 wherein the thermoplastic polymer composition contains a polystyrene-polyisobutylene-polystyrene triblock copolymer and a crosslinked rubber of an isobutylene.isoprene copolymer, but a ratio of each of these components is outside the range of the present invention and the content of the polystyrene-polyisobutylene-polystyrene triblock copolymer is less than 10 wt. %, the coring property of the stopper is poor and a gasket for syringe manufactured from such a thermoplastic polymer composition indicates a large value in each of the foaming property, Δ pH, Δ potassium permanganate consumption amount and evaporation residue amount and therefore has poor safety and hygienic properties.

Furthermore, it has been found that in Comparative Example 5 wherein the polymer composition contains a polystyrene-polyisobutylene-polystyrene triblock copolymer and a crosslinked rubber of an isobutylene.isoprene copolymer, but the ratio of each of the components is outside the above range and the content of the polystyrene-polyisobutylene-polystyrene triblock copolymer exceeds 90 wt. %, the polymer composition has a large compression set, small elastic recovery and has poor hermetically sealing properties, which can be confirmed from the results of the performance test of the stopper made from the above composition such as occurrence of liquid leakage from the stopper applied and liquid leakage after a needle insertion and inferior coring property.

It has also been found that in Comparative Example 6 wherein a polymer composition was prepared from a hydrogenated polystyrene-polyisoprene-polystyrene triblock copolymer, which was used instead of a polystreyne-polyisobutylene-polystyrene triblock copolymer, and a crosslinked rubber of an isobutylene.isoprene copolymer, the polymer composition has a large oxygen gas permeability and therefore has poor gas barrier properties, which can also be confirmed from the results of the performance test of the stopper made from the composition such as occurrence of liquid leakage from the stopper applied and liquid leakage after a needle insertion and inferior coring property. Furthermore, the gasket for syringe produced using the polymer composition of Comparative Example 6 indicated a large value in each of foaming property, Δ pH, Δ potassium permanganate consumption amount and evaporation residue amount so that it is poor in safety and hygienic properties.

Furthermore, it is apparent that the polymer composition of Comparative Example 7 obtained by statical crosslinking of the blend of a polystyrene-polyisobutylene-polystyrene triblock copolymer and an isobutylene.isoprene copolymer rubber is different from the thermoplastic polymer composition of the present invention, because it does not exhibit thermoelasticity and has poor moldability or formability.

Industrial Applicability

The polymer composition of the present invention is thermoplastic and therefore can be molded or formed by the process and apparatus ordinarily employed for thermoplastic polymer compositions. Various molded or formed products of any shape or size can be produced by melt molding or forming the composition, for example, by injection molding, extrusion, press molding, blow molding or the like.

The thermoplastic polymer composition according to the present invention is excellent in moldability or formability, gas barrier properties, compression set resistance, hermetically sealing properties, sealing properties, flexibility, mechanical properties, oil resistance, safety and hygienic properties. It can be used effectively for the production of general-purpose molded or formed products or hermetically sealing materials such as sealant, packing material or gasket, by making use of the above-described properties.

In particular, hermetically sealing materials for medical tools produced using the thermoplastic polymer composition of the present invention, for example, stopper for medical container, gasket for syringe, sealing or packing material for vacuum blood-collecting tube, are free from liquid leakage from the stopper applied, liquid leakage after needle insertion and separation of polymer pieces upon needle insertion and hardly elute their components into a medicament solution so that they can be handled with good operability while sufficient safety and hygienic properties are maintained.

Furthermore, the thermoplastic polymer composition of the present invention can be used safely and hygienically for the hermetically sealing materials in the food-related field such as food producing apparatus or container for preserving or packing food and other applications, by making use of the above-described excellent properties.

What is claimed is:

1. A thermoplastic polymer composition formed by a melt mixing method comprising,
    (A) a block copolymer comprised of a polymer block composed mainly of an aromatic vinyl compound and a polymer block composed mainly of isobutylene; and
    (B) a crosslinked rubber of at least one rubber selected from the group consisting of a natural rubber, a diene polymer rubber, an olefin polymer rubber, an acrylic rubber and a fluorine rubber;
    at a weight ratio of (A) to (B) of 90:10 to 10:90;
    wherein the crosslinked rubber (B) has been obtained by dynamic crosslinking, in the presence of a crosslinking agent, at the time when the block copolymer (A) is melt mixed with the rubber in component (B).

2. A thermoplastic polymer composition according to claim 1, wherein the crosslinked rubber (B) is dispersed in the continuous phase of the block copolymer (A) or the block copolymer (A) and the crosslinked rubber (B) form a co-continuous phase.

3. A thermoplastic polymer composition according to claim 1, wherein the crosslinked rubber (B) has a particle size of 0.1 to 10 μm.

4. A thermoplastic polymer composition according to claim 1, wherein the gel amount represented by the below-described equation (1) ranges from 20 to 80%;

$$\text{wherein the amount of the gel } (\%) = (Wc/Wu) \times 100 \tag{1}$$

wherein Wc represents a weight (g) of the insoluble content of the thermoplastic polymer composition in cyclohexane and Wu represents a weight (g) of the thermoplastic polymer composition.

5. A thermoplastic polymer composition according to claim 1, which has a compressive deformation strain not greater than 70% at the time when it is left alone under the conditions of an atmospheric temperature of 70° C. and a compressive deformation amount of 25% for 22 hours in accordance with JIS-K6301.

6. A thermoplastic polymer composition according to claim 1, wherein the crosslinked rubber (B) is a crosslinked product of at least one rubber selected from isobutylene.isoprene copolymer rubber, halogenated isobutylene.isoprene copolymer rubber, isobutylene.halogenated methylstyrene copolymer rubber and styrene.butadiene copolymer rubber.

7. A molded or formed product obtained using the thermoplastic polymer composition as claimed in claim 1.

8. A hermetically sealing material obtained using the thermoplastic polymer composition as claimed in claim 1.

9. A hermetically sealing material for medical tools, which material is obtained using the thermoplastic polymer composition as claimed in claim 1.

10. A gasket for syringe obtained using the thermoplastic polymer composition as claimed in claim 1.

11. A hermetically sealing material for food producing apparatus or food package, which material is obtained using the thermoplastic polymer composition as claimed in claim 1.

* * * * *